May 18, 1965 S. PETERSON ETAL 3,183,889
AUTOMATED EGG NEST
Filed Sept. 5, 1963 2 Sheets-Sheet 1
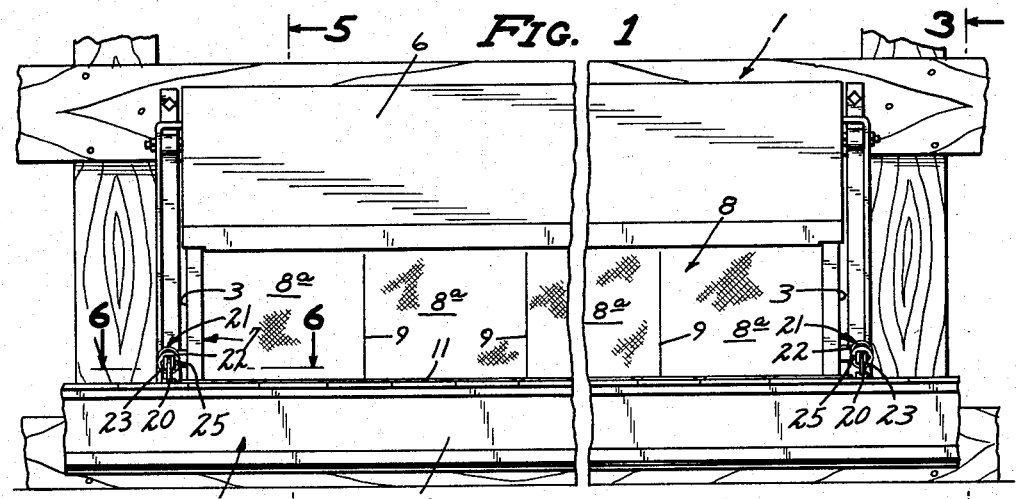
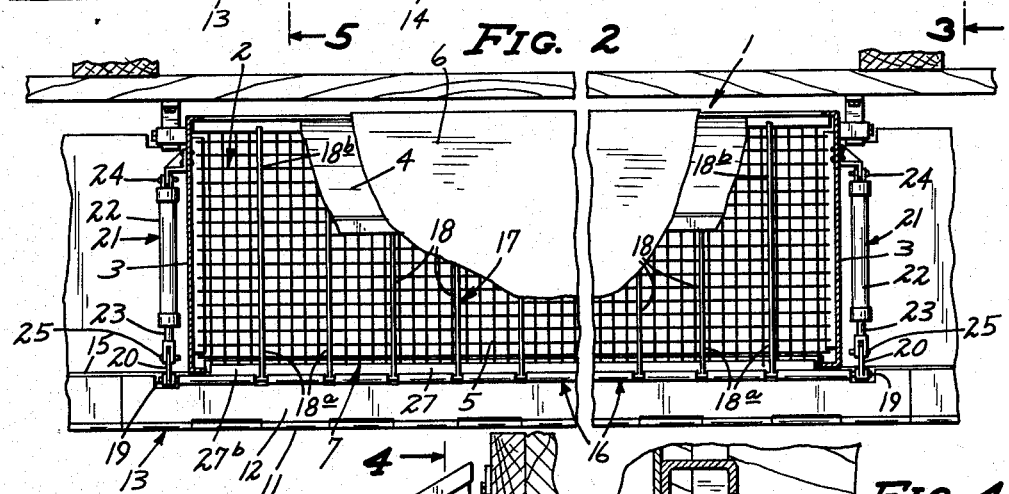
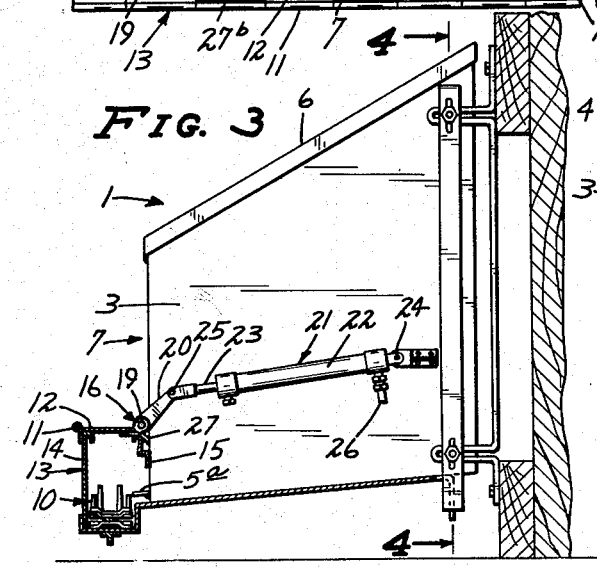
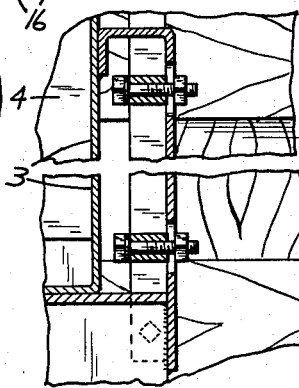
INVENTORS.
SEYMOUR PETERSON
JOHN W. GRANATH
BY
ATTORNEYS May 18, 1965  S. PETERSON ETAL  3,183,889
AUTOMATED EGG NEST
Filed Sept. 5, 1963  2 Sheets-Sheet 2
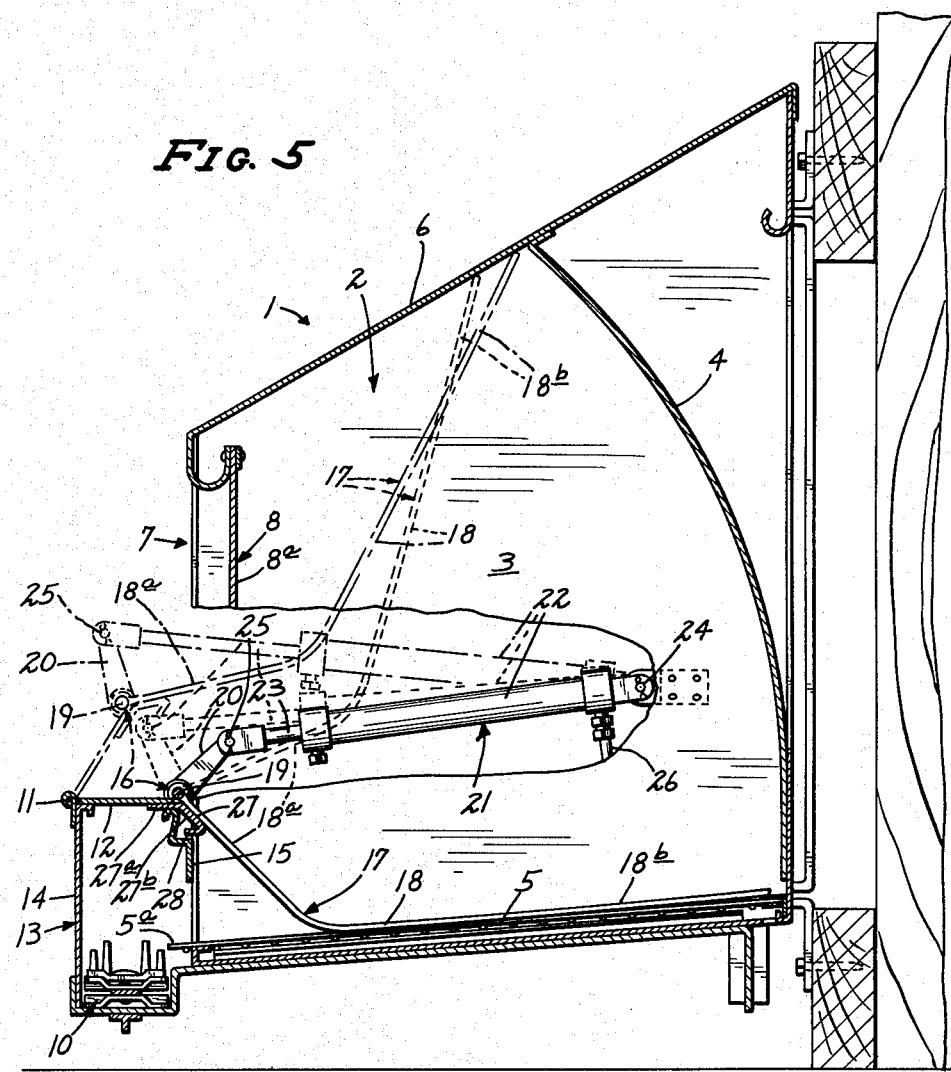
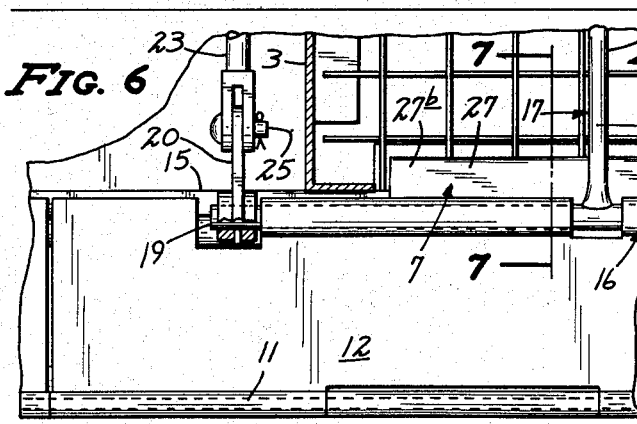
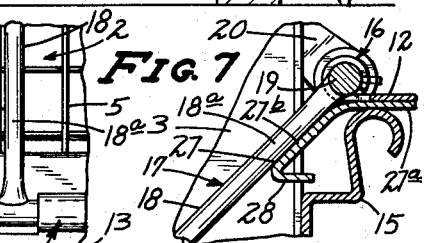
INVENTORS.
SEYMOUR PETERSON
JOHN W. GRANATH
BY
ATTORNEYS

United States Patent Office 3,183,889
Patented May 18, 1965

3,183,889
AUTOMATED EGG NEST
Seymour Peterson and John W. Granath, Dassel, Minn., assignors to Storm Industries, Inc., Dassel, Minn., a corporation of Minnesota
Filed Sept. 5, 1963, Ser. No. 306,932
8 Claims. (Cl. 119—45)

Our invention relates to poultry nesting devices and is in the nature of a continuation-in-part of our co-pending application Serial No. 264,655, filed March 12, 1963, and entitled "Automated Egg Nest."

In nests of the type disclosed in our above identified patent, it has been found that under unusual circumstances chickens which die in the nest are not effectively removed by the sweep-barrier element. Instead of being thrown clear of the housing overlying the egg collection belt positioned immediately forwardly of the nest, these dead chickens occasionally come to rest upon the top of the housing, and are thereafter deposited back into the nest when the barrier element is again dropped back to a horizontal position overlying the bottom thereof.

The primary object of our present invention is the provision of means whereby such dead chickens will be thrown completely free from the sweep-barrier element as well as the housing associated with the egg collection belt.

A further object of our invention is the provision of a device of the class immediately above described wherein means is provided for positively preventing the trapping of live or dead birds between the sweep-barrier element and any of the walls of the nest during sweeping or return movements.

A still further object of our invention is the provision of a device of the class above described wherein means is provided for discouraging roosting of chickens upon the cover and housing for the egg collection belt during periods wherein the sweep-barrier element is in a barrier-forming position.

A still further object of our invention is the provision of a nest of the class above described which incorporates but a minimum of working parts, and is foolproof in its operation.

A still further object of our invention is the provision of a device of the class above described which is not unduly expensive to produce and is relatively easy to install, maintain, and service.

The above and still further objects of our invention will become apparent from the following detailed specification, appended claims, and attached drawings.

Referring to the drawings wherein like characters indicate like parts throughout the several views:

FIG. 1 is a view in front elevation of an egg nest constructed in accordance with our invention, some parts being broken away.

FIG. 2 is a view in top plan of the structure of FIG. 1, some parts being broken away and some parts being shown in section.

FIG. 3 is a view in vertical section as seen from the line 3—3 of FIG. 1, some portions being shown in side elevation.

FIG. 4 is an enlarged fragmentary sectional view taken on the line 4—4 of FIG. 3, portions thereof being broken away.

FIG. 5 is a view in vertical section taken on the line 5—5 of FIG. 1, some portions thereof being broken away.

FIG. 6 is an enlarged fragmentary sectional view taken on the line 6—6 of FIG. 1, and FIG. 7 is an enlarged sectional detailed view taken on the line 7—7 of FIG. 6.

Referring with greater particularity to the drawings, the numeral 1 indicates in its entirety a housing form to provide a nesting chamber 2, the side walls of which are identified by 3, the rear wall by 4, the bottom wall by 5, and the top by 6.

The open front 7, jointly defined by the wall elements 3, 4, 5, and 6, is normally provided with a depending fabric curtain 8 which, as shown particularly in FIG. 1, is provided with longitudinally spaced vertical slits 9 which separate the curtain 8 into a plurality of curtain sections 8a. It will be noted that the bottom 5, which is in the nature of a screen, slants forwardly from the rear wall 4 to the open front 7 whereby to cause eggs, not shown, but laid thereon, to roll, under the action of gravity, out of the open front 7 and on to a conveyor belt identified in its entirety by 10. It will be noted that the belt 10 is spaced immediately forwardly of the open front 7 and that the path of travel thereof is parallel to the longitudinal axis of the housing 1.

Shown as being pivotally secured along its front edge on a horizontal axis is a cover member 12 forming part of a housing 13 for the conveyor belt 10. The vertical leg of the housing 13 bears the numeral 14. Extending between the side walls 3 adjacent to the open front 7 and in upwardly spaced relationship to the delivery edge 5a of the bottom wall 5 is a brace 15 which supports the cover member 12 in its horizontal position.

As shown, because of the mechanism above described, the cover member 12 is mounted for upward and forward swinging movements about the axis 11, as indicated in dotted lines in FIG. 5. Pivotally secured to the rear edge of the cover member 12 on an axis 16 which is parallel to the axis 11, is a sweep-barrier element, identified in its entirety by 17 and comprising a plurality of generally parallel longitudinally spaced rearwardly extending tines 18 which are spaced apart longitudinally of the axis 16 of the rockshaft 19 to which they are secured at their forward ends. It might here be stated that the cover member 12 and the sweep-barrier element 17 form cooperating links of a toggle, the purpose of which will hereinafter become apparent. Sweep-barrier element 17, as shown, comprises angularly disposed relatively short front portions 18a and relatively elongated rear portions 18b.

Projecting generally radially upwardly from opposite ends of the rockshaft 19 are mating crank arms 20. A pair of fluid pressure-operated extensible and retractable members, identified in their entireties by 21, are interposed between the opposite side walls 3 and the projected upper ends of the crank arms 20. Members 21 are entirely conventional in nature and include elongated cylinders 22 and piston-equipped cooperating rams 23. At their rear ends, the cylinders 21 are pivotally secured as at 24 to an adjacent side wall 3, whereas the forward ends of the rams 23 are pivotally secured to the extended upper ends of the crank arms 20, as indicated at 25. Fluid under pressure is introduced into the rear end portions of the cylinders 21 to advance the rams 23, and parts carried thereby, from the full line showing of FIG. 5 progressively to the dotted and then the broken line showings thereof, by suitable conduits 26. The pistons, not shown, are under yielding bias to return to the full line showing of FIG. 5 by springs, not shown, but enclosed within the cylinders 21. It will be noted that the pivotal connections 24 of the cylinders 21 are above the level of the connections 25.

Under the arrangement above described, as fluid under pressure is introduced into cylinders 21, through their respective conduits 26, from a source not shown, the rams 23, cylinders 21, crank arms 20, and tines 18 will be caused to assume their dotted line positions wherein the projected rear ends of the tines 18 come into engagement with a stop member such as the top wall 6. Thereafter, further extension of the rams 23 will cause the forces thereof to be transferred from movement of the tines 18 about the axis 16 to movement of the axis 16 about the pivot 11 whereby to cause the axis 16 of toggle forming members 12, 13 to pass over dead center to the broken line position of FIG. 5. This final snap action is sufficient to dislodge and be thrown clear of any dead birds which might come to rest wholly or in part on the front end portions of the tines 18, or, alternatively, on the cover member 12.

For the purpose of giving much needed support to the forward ends 18a of the tines 18 when the sweep-barrier element 17 is in the broken line barrier-forming position of FIG. 5, an elongated clip-like member 27 is provided. As shown, member 27 comprises a flat strip 27a which is soldered or otherwise rigidly secured to the under surface of the cover member 12, immediately adjacent the rockshaft 19, and an angularly rearwardly extended supporting shelf 27b, which is back-turned upon itself, as at 28, for purposes of reinforcement.

Our invention has been thoroughly tested and found to be completely satisfactory for the accomplishment of the above objects; and while we have disclosed a preferred embodiment thereof, same may well be capable of modification without departure from the scope and spirit of the appended claims.

What is claimed is:

1. A poultry nest having:
   (a) opposite side, top, bottom and rear walls which cooperate to define a nesting chamber having an open front,
   (b) a combination sweep-barrier element extending between said side walls,
   (c) means pivotally mounting the forward end of said element for pivotal swinging movements of the free rear end portion thereof from a generally horizontal position adjacent the bottom wall of said chamber to a generally upright, tilted position adjacent the open front where it constitutes a barrier to said chamber,
   (d) said rear wall being closely spaced from and having a contour which conforms generally to the path of travel described by the said free rear end portion of said sweep.

2. A poultry nest having:
   (a) opposite side, top, bottom and rear walls which cooperate to define a nesting chamber having an open front,
   (b) a combination sweep-barrier element extending between said side walls,
   (c) means pivotally mounting the forward end of said element for pivotal swinging movements of the free rear end portion thereof from a generally horizontal position adjacent the bottom wall of said chamber to a generally upright, tilted position adjacent said open front wherein it constitutes a barrier to said chamber,
   (d) an egg collection belt forwardly of said open front and adapted to receive eggs from said nesting chamber under the action of gravity,
   (e) a cover member overlying said belt,
   (f) means mounting the front end portion of said cover member for pivotal upwardly and forward swinging movements with respect to said belt,
   (g) and means imparting raising movements to said cover member responsive to movements of said sweep-barrier element.

3. A poultry nest having:
   (a) opposite side, bottom and rear walls which cooperate to define a nesting chamber having an open front,
   (b) an egg collection belt forwardly of said open front and adapted to receive eggs from said nesting chamber under the action of gravity,
   (c) a cover member overlying said belt,
   (d) means mounting the front end portion of said cover member for pivotal upward and forward swinging movements of the rear end thereof with respect to said belt,
   (e) a sweep-barrier element pivotally secured on a horizontal axis to said rear end portion of said cover member for swinging movements of the free rear end thereof from a generally horizontal position adjacent to the bottom wall of said nesting chamber to an upwardly and rearwardly inclined position wherein it constitutes a barrier to said chamber and forming with said cover member a toggle,
   (f) a generally horizontally disposed extensible and retractable member,
   (g) crank-arm means associated with said forward end portion of said sweep-barrier element and projecting generally radially upwardly from the pivot axis thereof,
   (h) means pivotally connecting one end of said extensible and retractable member to the upwardly projected end of said crank-arm means,
   (i) means pivotally connecting the opposite end of said extensible and retractable member with respect to said nest, and
   (j) means limiting upward swinging movement of the free rear end of said sweep-barrier element whereby final extending movements of said extensible member are transmitted through said crank arm to the rear end portion of said cover member to impart upward and forward swinging movements thereto.

4. The structure defined in claim 3 in which said opposite end of said extensible and retractable member is pivotally secured to one of the sidewalls of said nest.

5. The structure defined in claim 4 in which said pivotal connection of said extensible and retractable member to said sidewall is above the pivotal connection of said extensible and retractable member to said crank-arm means.

6. The structure defined in claim 3 in further combination with means limiting extending movements of said extensible and retractable member, said last mentioned means including means carried by said cover member for supporting the forward end portion of said sweep-barrier element immediately rearwardly of the pivot axis thereof.

7. The structure defined in claim 3 in which the means limiting the upward swinging movement of said sweep-barrier element comprises the top wall of said nest.

8. A poultry nest having:
   (a) opposite side, bottom and rear walls which cooperate to define a nesting chamber having an open front,
   (b) a sweep-barrier element interposed between said side walls,
   (c) means pivotally mounting the forward end of said element for pivotal swinging movements of the free rear end thereof from a generally horizontal position adjacent the bottom wall of said chamber to a generally upright, tilted position adjacent the open front where it constitutes a barrier to said chamber,
   (d) said means comprising a link pivotally secured at its outer end on a horizontal axis adjacent said open front and pivotally secured at its rear end to the forward end of said sweep-barrier element and cooperating with said sweep-barrier element to define a toggle,
   (e) crank arm means associated with the forward end of said sweep-barrier element and projecting generally upwardly therefrom,
   (f) a generally horizontally disposed extensible and retractable member,
   (g) means pivotally connected one end of said extensible and retractable member to the upwardly projected end of said crank arm means, (h) means pivotally connecting the opposite end of said extensible and retractable member with respect to said nest, and (i) means limiting upward swinging movements of the free rear end of said sweep-barrier element whereby final extending movements of said extensible member are transmitted through said crank arm means to the rear end portion of said link to impart upward and forward swinging movements thereto as said toggle passes over dead center.

References Cited by the Examiner

UNITED STATES PATENTS

| | | | |
|---|---|---|---|
| 2,564,207 | 8/51 | Marshall | 119—47 |
| 2,694,381 | 11/54 | Kaegebein | 119—48 |
| 2,695,006 | 11/54 | Tellefson | 119—48 |
| 3,027,871 | 4/62 | Peterson | 119—45 |

SAMUEL KOREN, *Primary Examiner.*

ALDRICH F. MEDBERY, *Examiner.*